United States Patent
Baeuerle et al.

(10) Patent No.: US 8,191,455 B2
(45) Date of Patent: Jun. 5, 2012

(54) PNEUMATIC ACTUATING DRIVE HAVING INTEGRATED ELECTROPNEUMATIC POSITION CONTROL

(75) Inventors: Michael Baeuerle, Eberdingen (DE); Helmut Schneider, Aichtal (DE); Dirk Hoeffken, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 627 days.

(21) Appl. No.: 12/227,624

(22) PCT Filed: Apr. 23, 2007

(86) PCT No.: PCT/EP2007/053929
§ 371 (c)(1),
(2), (4) Date: Apr. 27, 2009

(87) PCT Pub. No.: WO2007/147661
PCT Pub. Date: Dec. 27, 2007

(65) Prior Publication Data
US 2009/0205332 A1    Aug. 20, 2009

(30) Foreign Application Priority Data
Jun. 19, 2006   (DE) .......................... 10 2006 028 015

(51) Int. Cl.
*F01L 25/08*     (2006.01)
*F15B 13/043*    (2006.01)

(52) U.S. Cl. ................... 91/275; 91/459; 60/602
(58) Field of Classification Search ............ 60/602; 91/275, 459
See application file for complete search history.

(56) References Cited

U.S. PATENT DOCUMENTS

| 3,783,901 | A  | * | 1/1974  | Schneider et al. ....... 137/625.64 |
| 4,424,675 | A  | * | 1/1984  | Ojima ................ 60/602 |
| 5,755,101 | A  |   | 5/1998  | Free et al. |
| 6,658,846 | B1 | * | 12/2003 | McEwan ................ 60/602 |
| 2002/0195151 | A1 | | 12/2002 | Erickson et al. |

FOREIGN PATENT DOCUMENTS

| DE | 2 213 439  | 10/1973 |
| EP | 0 976 919  | 2/2000  |
| FR | 2 176 670  | 11/1973 |
| GB | 2 078 856  | 1/1982  |
| JP | 59-110839  | 6/1984  |

* cited by examiner

*Primary Examiner* — Quyen Leung
*Assistant Examiner* — Thomas Truong
(74) *Attorney, Agent, or Firm* — Kenyon & Kenyon LLP

(57) ABSTRACT

An electropneumatic actuator system for operating assemblies of an internal combustion engine includes a housing, in which an actuator is movably accommodated, which in turn is configured to be hollow and includes an aeration channel and a deaeration channel. A control slide valve is assigned to the actuator which is operated by a magnetic coil and which aerates, deaerates or closes a pressure chamber of the housing as a function of the relative position of the actuator.

17 Claims, 3 Drawing Sheets

PNEUMATIC ACTUATING DRIVE HAVING INTEGRATED ELECTROPNEUMATIC POSITION CONTROL

BACKGROUND OF THE INVENTION

1. Field of the Invention

The present invention relates to an electropneumatic actuator system for operating assemblies of an internal combustion, and a method for regulating the actuator system.

2. Description of Related Art

Within the scope of motor vehicle actuating systems, pneumatic actuators are used in the automotive field, these days. The pneumatic actuators are predominantly developed as pressure boxes, which are able to be operated both using an overpressure or a partial vacuum. The pressure boxes are generally not controlled electronically, and they are developed in such a way that the pressure prevailing in the pressure boxes, such as a boost pressure, act directly on a spring or a diaphragm. In pressure boxes used on charging devices for internal combustion engines, especially on exhaust-gas turbochargers, the actuating position of the actuator of the pressure box is controlled in an electronic manner by actuating a pulse valve using a PWM signal from a boost pressure controller. The actuated pulse valve sets the pressure of the pressure box, or the position of the actuator of the pressure box, required for a boost pressure/setpoint value comparison or a boost pressure/actual value comparison. The pulse valve may be provided both externally, as, for instance, in the supply line to the pressure box, or it may be integrated into the pressure box. When it comes to a state regulation with regard to the position of the actuator of a pressure box, very costly electronic regulations are required. In particular in the case of self-igniting internal combustion engines, to which a charging device has been allocated which may be an exhaust-gas turbocharger, designed to have an adjustable turbine geometry, as a result of the coupling between the exhaust gas recirculation and the boost pressure regulation a regulation is, however, increasingly urgently required of the position of the actuator of the pressure box. For the implementation of this, only relatively costly electrical actuators come into consideration, that have position feedback and electronic position control, which, on the one hand, may be assigned directly to the charging device having adjustable turbine geometry or are integrated into the engine control unit of an internal combustion engine.

A charging device is known from published European patent document EP 0 976 919, which is developed as an exhaust-gas turbocharger and includes a wastegate. An actuating rod is used for the boost pressure regulation on the exhaust-gas supercharger, and it has a first rod section and a second rod section. The two rod sections of the actuating sections are coupled to each other rotatably, and may be rotated with respect to each other. A lever is operated, using the actuating rod, which on its part is coupled to the wastegate of the exhaust-gas supercharger.

BRIEF SUMMARY OF THE INVENTION

In view of the related art, an object of the present invention is providing a pneumatic actuator which pneumatically regulates the position of an actuator within the scope of a setpoint/actual comparison, as a function of an incoming signal representing the setpoint position.

According to the present invention, a self-regulating pneumatic actuator is provided which has a piston-rod shaped actuator which cooperates with a diaphragm, the position of the actuator being able to be adjusted precisely in an electropneumatic way. Owing to this design approach, a costly and temperature-sensitive electronic system or sensor system may be avoided. Furthermore, the design approach provided according to the present invention is distinguished by having reduced air usage. Lateral sections on the actuator, developed in the shape of a piston rod required for aeration and deaeration may simultaneously be closed, so that the currently set box pressure and the position of the actuator developed in a piston-rod-shape may be maintained. In the following, by box pressure we shall mean the pressure that prevails in the vacuum range of the pneumatic actuator.

The control response of the pneumatic actuators provided may be optimized for the aeration and deaeration by adapting opening geometries of the lateral sections. Thus, for instance, the geometry of the lateral section over the height of lift of aeration and deaeration valves may be progressively developed, so that in the range of small setpoint/actual deviations the corrections made are slight, and in the range of greater setpoint/actual deviations a great correction is achieved. In the case of large deviations, because of this, rapid actuating motions are able to take place, without running the risk that, in the range of smaller deviations, instabilities come about, such as a vibration of the pneumatic actuator about the setpoint position.

In a first variant of an embodiment of the pneumatic actuator, it includes a rod-shaped actuator, that has been shrunk into a control slide valve, the former being hollow on the inside. A control slide valve which may be, for instance, shrunk onto the rod-shaped actuator, in each case includes an aeration valve and a deaeration valve. The aeration valve and the deaeration valve are connected via a channel to the inner hollow space of the rod-shaped actuator. Both the aeration valve and the deaeration valve are developed to be spring loaded, and close the two valves, for instance, via ball-shaped closing members, when there is an adjusted setpoint/actual position. As soon as a change in the position of the rod-shaped actuator comes about because of the action of outer disturbance variables, one of the two valves is gradually opened, and thereby corrects the pressure level within the pneumatic actuator. When such an adjusted position of the rod-shaped actuator is reached, both valves close again. At the circumference of the control slide valve a coil-shaped electromagnet may be accommodated, for instance, which, as a function of a present duty factor of the PWM control signal, exerts a magnetic force acting counter to the force of a control spring on a control slide enclosing the control valve, so that, as a result of the inertia of the control slide, a specified effective position is achieved which is equivalent to an equilibrium of forces. The effective position defines the position setpoint value of the purely pneumatically acting pneumatic actuator, and leads to an adjusting motion of the control slide valve enclosing the control valve, so that the lift position of the rod-shaped actuator is specified.

In one alternative example embodiment, the control slide valve may also be developed as a slim sleeve enclosing a rod-shaped actuator. The sleeve-shaped control slide valve covers two openings that are situated adjacently in the jacket of the rod-shaped control slide, of which one is used for aeration and the other for deaeration. The sleeve-shaped control slide valve includes an undercut, so that a short circuit is possible of the two adjacent openings used as channels, which are formed in the jacket of the rod-shaped actuator. As seen in the radial direction, the sleeve-shaped control slide valve is enclosed by the magnetic coil, and is prestressed by a pressure spring that is supported on the housing or on a bearing bush. In response to an axial motion corresponding to the load acting on the rod-shaped actuator, one of the two openings in the jacket of the rod-shaped actuator is cleared, so that, depending on the direction of motion, that is, in response to an increasing or decreasing load acting on the rod-shaped actuator, an aeration or a deaeration of a partial vacuum chamber of the pneumatic actuator takes place.

In the second embodiment variant of the design approach provided according to the present invention, a magnetic force, acting counter to the force of a control spring, is also transferred to the control slide valve via a coil-shaped electromagnet as a function of a present duty factor of the PWM signal, so that, as a result of the inertia of the control slide, a specified effective position sets in at the control slide, that is, a force equilibrium. The effective position corresponding to the force equilibrium defines the setpoint value.

DETAILED DESCRIPTION OF THE INVENTION

Figure 1:
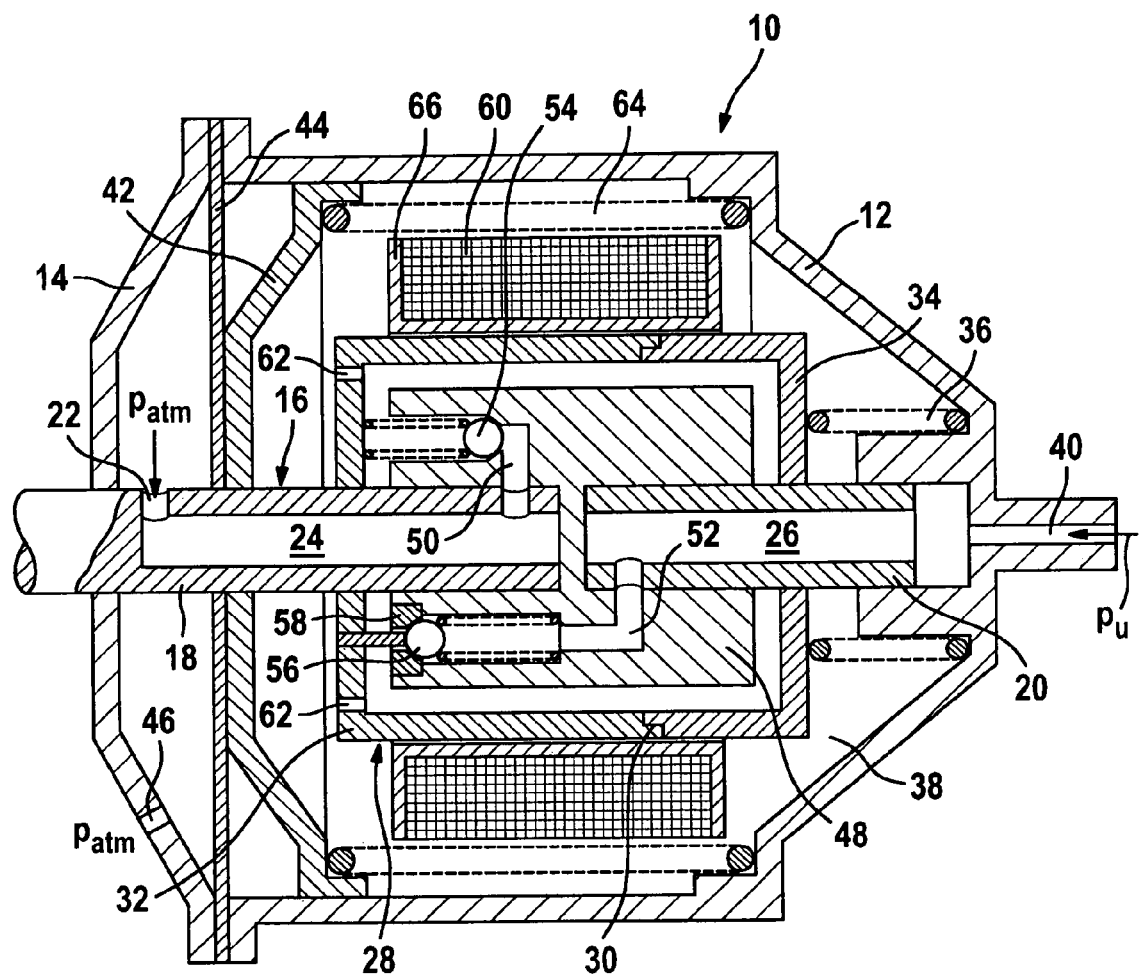
FIG. 1 shows the functioning principle of the electropneumatic actuator according to the present invention, with the aid of spring-loaded, tightly closing valves.

In the illustration of FIG. 1 one may see a first exemplary embodiment of the electropneumatic actuator provided according to the present invention, that is based on spring-loaded, tightly closing valves.

An electropneumatic actuator 10 includes a housing 12, which is closed via a housing cover 14 having a bore 46. Housing 12 is penetrated all the way through by a diaphragm rod, that is provided as actuator 16, which includes a first diaphragm rod part 18 as well as a second diaphragm rod part 20. At first diaphragm rod part 18 an opening 22 is provided for pressure equalization with the atmosphere. First diaphragm rod part 18 is penetrated by an aeration channel 24, and second diaphragm rod part 20 is also developed to be hollow and encloses a deaeration channel 26.

Guidance of diaphragm rod 16 that is developed in two parts in the illustration according to FIG. 1 is achieved, on the one hand, by a diaphragm disk 42, which is arranged shiftably within a hollow space 38 in housing 12, and has a tension spring 64 applied to it. Diaphragm disk 42 transfers the force of spring 64 to a diaphragm 44, that is connected to first diaphragm rod part 18, and diaphragm disk 42 is set against diaphragm 44. On the other hand, the guidance of the diaphragm rod, that is developed in two parts, within housing 12 is assured by a socket developed in housing 12. The inner part of the socket developed in housing 12 is sealed off by a seal, that is not shown in the illustration according to FIG. 1, for instance, an O-ring, from the diaphragm rod that is arranged to be movable and in two parts.

At the circumference of the diaphragm rod developed in two parts according to the exemplary embodiment shown in FIG. 1, there is a regulating slide 28. Regulating slide 28 includes a first regulating slide part 32 and a second regulating slide part 34, which are connected to each other at a joint 30. Regulating slide 28, that is movable relative to the diaphragm rod that is developed in two parts, has a spring 36 applied to it which is supported on top of the socket in housing 12. Regulating slide 28 encloses a control slide valve 48, in which, for its part, a first valve 54 for aeration and a second valve 56 for deaeration are developed. The first and the second valve are spring-loaded and close off sealingly in an adjusted setpoint/actual position, for instance, via ball-shaped closing elements. A pressure spring applied to the ball-shaped closing element of first valve 54 is supported on second regulating slide part 34. The ball-shaped closing element of second valve 56, which is used for deaeration of deaeration channel 26, includes a bushing 58 which has the ball-shaped closing element applied to it. A projection fixed on the regulating slide opens and closes second valve 56 which has the spring applied to it.

In the exemplary embodiment shown in FIG. 1, as soon as a change in position of two-part diaphragm rod 16 comes about, due to the effect of outer interference variables, in the case of the unchangeably maintained position of regulating slide 28 that is shiftable in the axial direction, one of the two valves 54 or 56 is opened for a time, and thereby the box pressure is corrected, having the correct sign, until both valves 54 and 56 close after reaching a renewed adjusted setpoint/actual position.

Using a magnetic coil 60 that encloses regulating slide 28, as a function of a present duty factor of the PWM signal (usually a few hundred Hertz), a magnetic force is exerted on regulating slide 28 acting counter to the force of spring 36, so that, as a result of the inertia of regulating slide 28, a force equilibrium sets in at regulating slide 28, between the magnetic force applied to regulating slide 28, on the one hand, and the force of spring 36 and the spring forces acting on valves 54 and 56, on the other hand. For the sake of completeness it should be mentioned that magnetic coil 60 is enclosed by a jacket.

The effective position of the control slide corresponding to the force equilibrium of regulating slide 28 defines a position setpoint value of a purely pneumatically acting position controller, and leads to an adjusting motion between regulating slide 28 and control slide valve 48, so that the position of diaphragm rod formed as two parts in the exemplary embodiment in FIG. 1 is defined. Whereas first valve 54 used for aerating aeration channel 24 is in connection with aeration channel 24 via a channel 50 that is developed in control slide valve 48, second valve 56, which is used for the deaeration of deaeration channel 26 is connected via a channel 52, that is also developed in control slide valve 48 to deaeration channel 26. In addition, deaeration channel 26 is connected via an opening 40 in housing 12 with to a pressure level, designated in FIG. 1 as $p_u$. The term $p_u$ designates a partial vacuum that is present at opening 40 of electropneumatic actuator 10, and which represents the source pressure of a vacuum pump. Pressure $p_u$ is of the order of magnitude of <0.25 bar.

Reference numeral 62 designates overflow openings in first regulating slide part 32, which make possible a pressure equalization between hollow space 38 and the hollow space which is formed in the space between control slide valve 48 and the inside of regulating slide 28. Hollow space 38 and the hollow space that is formed by the space between control slide valve 48 and the inside of regulating slide form a pressure chamber of housing 12, in which a pressure between partial vacuum $p_u$ and atmospheric pressure $p_{atm}$ is able to be set. The pressure between diaphragm 44 and housing cover 14 forms a chamber which has atmospheric pressure $p_{atm}$ applied to it, via a bore 46.

Figure 2:
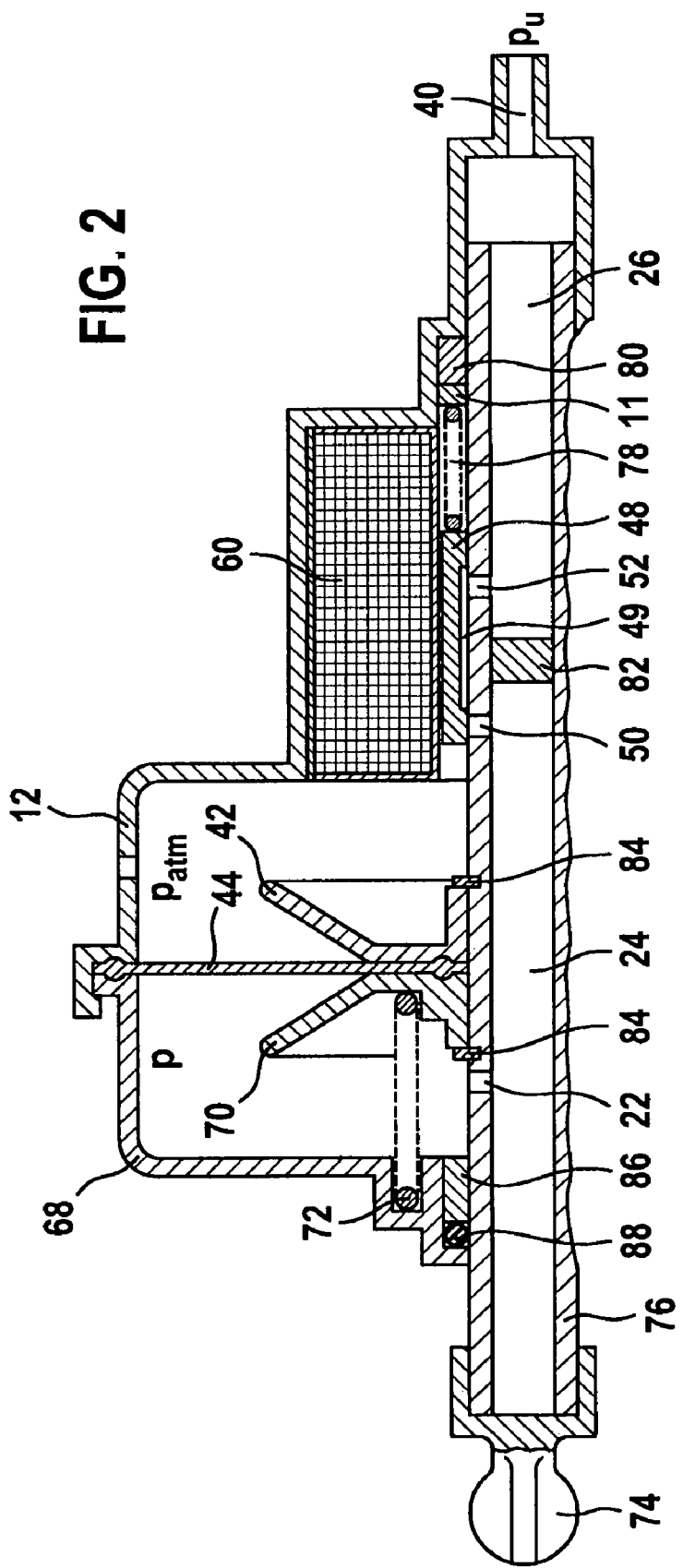
FIG. 2 shows an embodiment variant of the provided electropneumatic actuator according to the present invention.

In the representation according to FIG. 2, an additional embodiment variant will be seen of the pneumatic actuator having reduced air usage, provided according to the present invention.

The electropneumatic actuator 10, shown in FIG. 2 in half section with respect to its axis of symmetry, includes housing 12, within which diaphragm 44 is clamped at a partition joint. At housing 12, a pressure chamber 68 is executed, in which a pressure prevails that is different from $p_{atm}$. Pressure chamber 68 is separated via diaphragm 44 from the remaining internal space of housing 12. The subsequent comments relate to a pressure chamber 68, in which a partial vacuum prevails. However, pressure chamber 68 may also have applied to it a prevailing pressure above $p_{atm}$. The pressure in pressure chamber 68 is marked by p. On one side, diaphragm 44 has a spring plate 70 applied to it which, in turn, is prestressed by a diaphragm spring 72. Diaphragm spring 72 is supported on a recess of one housing half of housing 12. On the other side, diaphragm 44 clamped in housing 12 has diaphragm disk 42 applied to it. Diaphragm disk 42 is accommodated using two Seeger circlip rings on control plunger 76, that is to be regarded as an actuator developed in one part in the embodiment variant according to FIG. 2, and which corresponds essentially to diaphragm rod 16 developed in two parts in the exemplary embodiment according to FIG. 1.

Because of the two Seeger circlip rings 84, the axial positions of spring plate 70 and diaphragm disk 42 are specified with regard to control plunger 76 developed as one part. A spring 78 is supported on sleeve-shaped control slide valve 48 which, in the illustration according to FIG. 2, in the axial position drawn in there, closes two openings 50, 52 in the jacket of control plunger 76 that is developed as one part. Control slide valve 48 is movable in the axial direction relatively to one-part control plunger 76, is developed sleeve-shaped and includes an undercut 49 pointing towards the lateral surface of control plunger 76.

In the illustration according to FIG. 2, control slide valve 48 is developed in a simplified manner as a sleeve, by contrast to the exemplary embodiment shown in FIG. 1. Moreover, channels 50, 52, shown in the exemplary embodiment according to FIG. 1, are developed in the embodiment variant shown in FIG. 2 as openings 50, 52 in the jacket of control plunger 76. Coil 60, which is embedded in housing 12, is shown above sleeve-shaped control slide valve 48.

Control plunger 76, that is developed as a single part, is guided shiftably in bearing bushes 86, 11, which, in turn, are inset in housing 12. Between bearing bush 11 and housing 12 there may be a seal 80. Control plunger 76 that is developed hollow analogously to the exemplary embodiment in FIG. 1, includes a ball head 74, which may be used, for instance, to operate a wastegate 108 of a charging device 94 of an internal combustion engine 90 (cf. FIG. 3).

In the position in which sleeve-shaped control slide valve 48 is shown in the embodiment variant according to FIG. 2, undercut 49 covers second channel 52, but does not yet extend over first opening 50 in the wall of one-part control plunger 76. Between channels 50, 52 in the wall of control plunger 76 there is a stopper 82 which subdivides the hollow space of control plunger 76 into aeration channel 24 and deaeration channel 26. Pressure chamber 68 is in connection with aeration channel 24 via opening 22. At opening 40 of housing 12, pressure $p_u$ prevails, which deviates from atmospheric pressure $p_{atm}$, and which is generated by a vacuum source. In the part of internal space of housing 12, of electropneumatic actuator 10, that is not a part of pressure chamber 68, atmospheric pressure $p_{atm}$ prevails. In a position in which control slide valve 48 in FIG. 2 has been moved all the way to the right, aeration channel 24 is connected to the atmospheric pressure in housing 12 via channel 50.

In the illustration according to FIG. 2, sleeve-shaped control slide valve 48 is in a position in which it covers second channel 52. In this balanced position also designated as neutral position, the two channels 50, 52 are separated from each other, so that the pressure is not changed, and thus the position of single-part control plunger 76 is maintained. Undercut 49 covers only first channel 50, but not second channel 52.

In response to the action of outer disturbing forces, such as an increasing load acting on ball head 74, single-part control plunger 76 is shifted to the right. Because of the shifting motion of single-part control plunger 76 to the right, openings 50, 52 representing the channels are connected by undercut 49 at the inside of sleeve-shaped control slide valve 48, so that a deaeration (pressure drop) takes place in pressure chamber 68, and a balancing motion of control plunger 76 up to a neutral position is initiated.

In response to a decreasing load, that is, a shifting of control plunger 76 to the left, lateral section 50 used for aeration opens, so that the pressure on the inside of pressure chamber 68 is increased until, and diaphragm spring 72 is more greatly unloaded until the setpoint position is reached again. A pressure drop, a pressure increase as well as the maintaining of the pressure level in pressure chamber 68 of electropneumatic actuator 10 may be achieved via channels 50 and 52. Whereas second opening 52 is used for deaeration, that is, a pressure drop in pressure chamber 68, first channel 50, that is covered by control slide valve 48 and is able to be connected to second channel 52 via undercut 49, is used both for aeration and deaeration. In the case of an increasing load acting on ball head 74, if control plunger 76 is shifted to the right, a connection is created, via undercut 49 on the inside of control slide valve 48, between first channel 50 and second channel 52.

As opposed to a switchover valve, such as a magnetic valve, the electropneumatic actuator 10 described according to the embodiment variants shown in FIGS. 1 and 2 are distinguished by a considerably reduced air usage. The reduction in air usage is achieved by lateral cuts 50, 52 for aeration and deaeration being able to be closed simultaneously, so that the box pressure that is currently set and the position, either of two-part diaphragm rod 16 or of single-part control plunger 76 is able to be maintained. The embodiment variation of the pneumatic actuator shown in FIG. 1 is distinguished by a superb leakproofness at valves 54 and 56, and a minimal air usage. In the variant shown in FIG. 2, the gap losses that come about are minimal. In the two embodiment variants described in connection with FIG. 1 and FIG. 2 of electropneumatic actuator 10 provided according to the present invention, by optimizing the geometry of the openings, that is, by optimizing channels 50, 52 in the exemplary embodiment according to FIG. 1, or in the configuration of openings 50, 52 in the lateral surface of the single-part control plunger, the control response is able to be optimized. Thus, the lateral section pattern of channels 50, 52, or rather, openings 50, 52 over the opening lift of valves 54, 56 may be executed progressively, so that in the range of small setpoint/actual deviations, weak corrections are made, and in the range of large deviations, a strong correction may be achieved. Using that approach, in the case of large deviations a quick reaction may be taken, without taking the chance that within the range of small deviations instabilities set in, such as a vibration of control slide valve 48 about its setpoint position.

A position sensor system for diagnosing and monitoring the position of control slide valve 48 is preferably achieved by measuring the inductance of coil 60. To do this, one is able to make use of the plunger type armature principle. A motion of a control slide valve 48 that may be developed, for instance, from a ferromagnetic material, effects a variation of the coil inductance of coil 60 which, in turn, may be recorded as the measuring variable for the current actuating position of the RE, that is, of either two-part diaphragm rod 16 or, in the case of the exemplary embodiment according to FIG. 2, of single-part control plunger 76.

Figure 3:
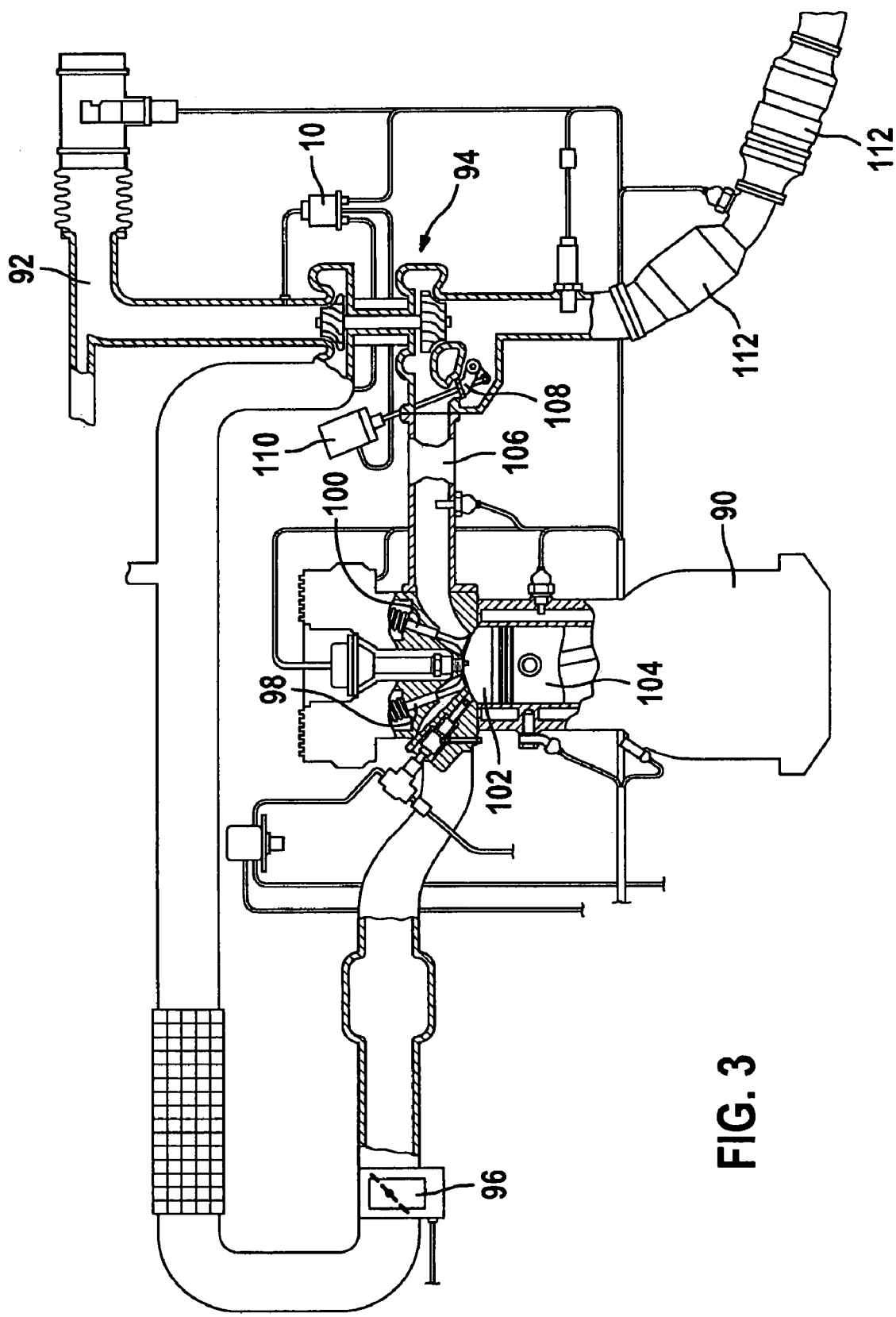
FIG. 3 shows a possibility of using the electropneumatic actuator according to the present invention on an internal combustion engine for operating a wastegate of a charging device.

From the illustration in FIG. 3 one may see in a schematic overview an installation position of the pneumatic actuator described above in connection with FIGS. 1 and 2.

One may see in the illustration according to FIG. 3 that fresh air is being supplied to internal combustion engine 90 via an intake manifold 92. A charging device 94 is allocated to internal combustion engine 90, and it has a compressor part situated in the intake manifold 92 and a turbine part postconnected to an exhaust manifold 106. A throttle device 96 is preconnected to the internal combustion engine on its intake side. Intake valves 98, in turn, are postconnected to throttle device 96, and via the former, the aspirated and precompressed fresh air enters combustion chambers 102 of internal combustion engine 90. Exhaust gas leaves combustion chambers 102 of internal combustion engine 90 via opened exhaust valves 100. Combustion chambers 102 are in each case limited by pistons 104; the combusted exhaust gas is pushed, during the exhaust strokes, from combustion chambers 102 into exhaust gas manifold 106, within which is located the compressor part of charging device 94 developed as a supercharger. A wastegate 108 is assigned to the turbine part of charging device 94 that is preferably developed as a supercharger. Using wastegate 108, a partial flow of the exhaust gas may be guided around the turbine part of charge device 54. Wastegate 108 is actuated via a wastegate actuator 110 which, in turn, is actuated via electropneumatic actuator 10, as described above in connection with FIGS. 1 and 2. For the sake of completeness, it should be mentioned that at least one catalytic exhaust-gas converter 112 is postconnected to the turbine part of charge device 94 in the exhaust gas tract of internal combustion engine 90.

Electropneumatic actuator 10, provided according to the present invention, may be used for the implementation of constant actuating tasks which become required at the assemblies in an internal combustion engine, such as exhaust-gas recycling valves ar variable intake manifold timing. In the present exemplary embodiment, electropneumatic actuator 10 of wastegate 108 is explained in exemplary form according to the illustration in FIG. 3.

What is claimed is:

1. An electropneumatic actuator for operating assemblies of an internal combustion engine, comprising:
    a housing having a pressure chamber;
    an actuator accommodated in the housing in a movable manner;
    a control slide valve assigned to the actuator, wherein the control slide valve is configured to one of aerate, deaerate or close the pressure chamber of the housing as a function of a relative position of the actuator;
    wherein one of a) the control slide valve is prestressed via a first spring supported on a stop of the actuator, or b) a regulating slide enclosing the control slide valve is prestressed via a second spring;
    wherein the control slide valve is enclosed by a magnetic coil which generates a force acting counter to the force of the first spring or the second spring, as a function of the duty factor of a PWM signal present at the magnetic coil.

2. The electropneumatic actuator as recited in claim 1, wherein the actuator has a hollow configuration and includes an aeration channel and a deaeration channel.

3. The electropneumatic actuator as recited in claim 1, wherein the control slide valve has a block form and has associated channels which are at least one of opened and closed as a function of the axial motion of the actuator by valves assigned to the channels.

4. The electropneumatic actuator as recited in claim 3, wherein the control slide valve is configured in a sleeve-shaped form, and wherein the control slide valve is configured to be axially shifted on the circumference of the actuator and cover the associated channels.

5. The electropneumatic actuator as recited in claim 1, wherein the actuator is configured as a hollow control plunger subdivided by a stopper into an aeration channel and a deaeration channel, and wherein a selected pressure level is applied to the deaeration channel by a vacuum source via an opening in the housing.

6. The electropneumatic actuator as recited in claim 1, wherein the actuator is guided by one of a) a diaphragm disk and a socket in the housing, or b) bearing bushes situated in the housing.

7. A method for regulating a position of an actuator of an electropneumatic actuator system having a coil and a control slide valve, comprising:
    a) applying a PWM signal at the coil and generating a magnetic force acting upon the control slide valve;
    b) shifting the control slide valve counter to one of i) a force of a pressure spring applied to the control slide valve or ii) a force of a control spring applied to a regulating slide enclosing the control slide valve;
    c) generating one of a pressure increase or a pressure drop in a pressure chamber as a function of a degree of opening of channels in the actuator; and
    d) generating and maintaining a specified position of the actuator by a force equilibrium between the spring force acting upon the control slide valve and the magnetic force acting upon the control slide valve.

8. The method according to claim 7, wherein the method is applied to an operation of a wastegate actuator of a charging device for an internal combustion engine.

9. An electropneumatic actuator for operating assemblies of an internal combustion engine, comprising:
    a housing having a pressure chamber;
    an actuator accommodated in the housing in a movable manner;
    a control slide valve assigned to the actuator, wherein the control slide valve is configured to one of aerate, deaerate or close the pressure chamber of the housing as a function of a relative position of the actuator;
    wherein the actuator is configured as a hollow control plunger subdivided by a stopper into an aeration channel and a deaeration channel, and wherein a selected pressure level is applied to the deaeration channel by a vacuum source via an opening in the housing.

10. The electropneumatic actuator as recited in claim 9, wherein one of a) the control slide valve is prestressed via a first spring supported on a stop of the actuator, or b) a regulating slide enclosing the control slide valve is prestressed via a second spring.

11. The electropneumatic actuator as recited in claim 9, wherein the control slide valve has a block form and has associated channels which are at least one of opened and closed as a function of the axial motion of the actuator by valves assigned to the channels.

12. The electropneumatic actuator as recited in claim 11, wherein the control slide valve is configured in a sleeve-shaped form, and wherein the control slide valve is configured to be axially shifted on the circumference of the actuator and cover the associated channels.

13. The electropneumatic actuator as recited in claim 9, wherein the actuator is guided by one of a) a diaphragm disk and a socket in the housing, or b) bearing bushes situated in the housing.

14. An electropneumatic actuator for operating assemblies of an internal combustion engine, comprising:
- a housing having a pressure chamber;
- an actuator accommodated in the housing in a movable manner;
- a control slide valve assigned to the actuator, wherein the control slide valve is configured to one of aerate, deaerate or close the pressure chamber of the housing as a function of a relative position of the actuator;
- wherein the control slide valve has a block form and has associated channels which are at least one of opened and closed as a function of the axial motion of the actuator by valves assigned to the channels;
- wherein the control slide valve is configured in a sleeve-shaped form, and wherein the control slide valve is configured to be axially shifted on the circumference of the actuator and cover the associated channels.

15. The electropneumatic actuator as recited in claim 14, wherein the actuator has a hollow configuration and includes an aeration channel and a deaeration channel.

16. The electropneumatic actuator as recited in claim 14, wherein one of a) the control slide valve is prestressed via a first spring supported on a stop of the actuator, or b) a regulating slide enclosing the control slide valve is prestressed via a second spring.

17. The electropneumatic actuator as recited in claim 14, wherein the actuator is guided by one of a) a diaphragm disk and a socket in the housing, or b) bearing bushes situated in the housing.

* * * * *